United States Patent [19]

Kuwabara et al.

[11] Patent Number: 4,999,666

[45] Date of Patent: Mar. 12, 1991

[54] IMAGE FORMING APPARATUS HAVING DRIVE CONTROL UNIT

[75] Inventors: Satoru Kuwabara, Chiryu; Takeshi Izaki, Nagoya; Kenji Sakakibara; Masanari Kobayashi, both of Ichinomiya, all of Japan

[73] Assignee: Brother Kogyo Kabushiki Kaisha, Aichi, Japan

[21] Appl. No.: 469,242

[22] Filed: Jan. 24, 1990

[30] Foreign Application Priority Data

Jan. 28, 1989 [JP] Japan .................................. 1-19068
Jan. 30, 1989 [JP] Japan .................................. 1-20402

[51] Int. Cl.$^5$ ............................................. G03B 27/32
[52] U.S. Cl. ........................................ 355/27; 355/68; 355/69
[58] Field of Search ...................... 355/27, 28, 30, 67, 355/68, 69, 285, 228; 219/216

[56] References Cited

U.S. PATENT DOCUMENTS 4,819,022  4/1989  Kurando ........................ 355/285 X Primary Examiner—L. T. Hix
Assistant Examiner—Khanh Dang
Attorney, Agent, or Firm—Oliff & Berridge

[57] ABSTRACT

An image forming apparatus including elements such as a light source, an exposure stand heater, a heat-fixing heater, a sheet feed motor and so on for performing a series of copying processes to form an image on a sheet and at least one power source for commonly supplying a power to the elements, further comprising plural sensors for detecting an operational condition of each of the elements such as a temperature of the heater, a rotation angle of the motor and so on and outputting a detection signal representative of the operational condition, and a control unit for controlling the power supply from the power source to the elements so that when the power supply to one of the elements is carried out to drive said one of the elements, the power supply to at least one of the other elements is ceased to stop the driving of at least one of the elements, and controlling the one of the elements on the basis of the detection signal from the sensors so that the operational condition of the one of the elements is substantially equal to a predetermined operational condition.

5 Claims, 5 Drawing Sheets

IMAGE FORMING APPARATUS HAVING DRIVE CONTROL UNIT

BACKGROUND OF THE INVENTION

This invention relates to an image forming apparatus in which a full-color copying is performed with a photosensitive recording medium such as a microcapsule sheet, and more particularly to an image forming apparatus having a drive control unit for controlling the power supply to and the driving of elements constituting the image forming apparatus.

In a conventional image forming apparatus such as a copying machine, an original is placed between an original glass stand and an original cover which are provided at the top portion of the image forming apparatus in such a manner as to be reciprocatedly movable in a horizontal direction. The original is irradiated with light by a light source comprising a halogen lamp and a semi-cylindrical reflector while the original glass stand and the original cover are moved, thereby performing a scanning operation of the original. The light reflected from the original is directed to an exposure stand at the center portion of the image forming apparatus through various optical systems and applied to one surface of a microcapsule sheet which has been supplied on the exposure stand, whereby a latent image is formed on the microcapsule sheet. The microcapsule sheet having the latent image on one surface thereof is contacted with a developer sheet under pressure to form a visible image on the developer sheet in a pressure developing process. The developer sheet having the visible image is heat-fixed in a heat-fixing process and then is discharged to an outside of the apparatus.

The conventional image forming apparatus as described above is equipped with a power source for receiving a power from a commercial power source. The power source rectifies the power from the commercial power source to obtain a D.C. voltage (for example, 24 volts) and supplies the D.C. voltage to respective elements of the apparatus such as a light source for irradiating light to the original, a driving unit for moving the original glass stand and so on, an exposure stand heater for keeping the temperature of the exposure stand above a predetermined value, driving motors for driving sheet feed rollers, pressure-developing rollers and other rollers, a heater for keeping a heat roller of a heat-fixing unit at a constant temperature, and so on. That is, the conventional image forming apparatus has the power source for commonly supplying predetermined voltages to the elements for performing a series of coping processes. Of the above elements, the driving motor for the pressure-developing rollers in the pressure-developing unit and the heaters for the exposure stand and the heat-fixing unit provide high loads to the power source, and the driving periods thereof in the series of the copying processes are overlapped with one another. Provision of these elements having the high loads in the apparatus requires a power source having a sufficiently large capacity to the degree that all of the elements can be simultaneously driven. This requirement prevents the image forming apparatus itself from being miniaturized and the cost thereof and the power consumption from being reduced.

Further, when the elements having high loads are simultaneously driven, the operations of the elements are liable to be unstable because the power (voltage) is commonly supplied from the power source to the elements and an unstable operation of one of the elements causes the other elements to be unstably operated. For example, the fluctuation of the voltage to be applied to one of the elements causes the fluctuation of the voltages to be applied to the other elements.

The above disadvantage of the conventional image forming apparatus will be described in detail in a case where a power is commonly supplied from the power source to the light source and the heater of the heat-fixing unit.

The light source of the image forming apparatus is so designed that the amount of light of the light source is changeable to adjust light and darkness of an image to be copied. In order to adjust the amount of light of the light source, light produced by the light source is irradiated to a white reference plate, and the light reflected from the white reference plate is detected by a sensor to measure the amount of light of the reflected light. Thereafter, the voltage to be applied to the light source by the power source is adjusted so that the measured amount of light by the sensor is within a predetermined value.

On the other hand, the temperature of the heater in the heat-fixing unit is monitored and controlled by a thermistor so as to be within a predetermined range. For example, in accordance with an output signal of the thermistor, a current supply to the heater is carried out when the temperature of the heater is below a predetermined value, and is not carried out when the temperature of the heater is above a predetermined value.

Accordingly, in the conventional image forming apparatus are there two cases where an operation of adjusting the light amount of the light source and an operation of supplying the current to the heater of the heat-fixing unit are simultaneously carried out, and where only one of the two operations is carried out. That is, when the amount of light of the light source is adjusted ( the voltage to be applied to the light source by the power source is adjusted), there is two cases where the current is supplied to the heater from the power source (hereunder referred to as "current supply state") and where the current is not applied to the heater from the power source (hereunder referred to as "non current supply state"). Therefore, the voltage to be applied to the heater is fluctuated in accordance with the two states ( that is, the current supply state and the non current supply state because the voltage is commonly supplied to the light source and the heater of the heat-fixing unit. This fluctuation of the voltage to be applied to the light source causes the adjustment of the light amount of the light source to be unstable, and thus the adjustment of the light and darkness of the image to be copied is not accurately performed. In place of the common supply of the voltage to the light source and the heater of the heat-fixing unit, two power sources used separately for the light source and the heater, respectively, may be provided. However, in this case, plural electrical parts such as terminals for connecting to the power sources, a transformer and so on are required, and the construction is complicate. Accordingly, this method is not satisfied for practical use.

SUMMARY OF THE INVENTION

In order to overcome the above disadvantages of the conventional image forming apparatus, an object of this invention is to provide an image forming apparatus in which driving periods of elements of the image forming apparatus are suitably adjusted to perform a stable operation of each of the elements.

Another object of this invention is to provide an image forming apparatus in which the operation of each of the elements is stably carried out with no affection of the other elements even though power is commonly supplied from a power source to the elements.

In order to attain the above objects, an image forming apparatus according to this invention includes elements for performing a series of copying processes to form an image on a sheet, at least one power source for commonly supplying a power to the elements, sensor means for detecting an operational condition of each of the elements and outputting a detection signal representative of the operational condition, and control means for controlling the power supply from the power source to the elements so that when the power supply to on of the elements is carried out to drive one of the elements, the power supply to at least one of the other elements is ceased to stop the driving of at least one of the elements, and controlling the one of the elements on the basis of the detection signal from the sensor means so that the operational condition of the one of the elements is substantially equal to a predetermined operational condition.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

The preferred embodiments of this invention will be described in detail with reference to the accompanying drawings.

In an image forming apparatus according to this invention, control means is provided to control a power supply operation of a power source to each of various elements which are provided in the apparatus for performing a series of the copying processes and thus control the driving of the elements. When one of the elements providing a high load to the power source is operated, the control unit discriminates those elements which are not necessary to be operated, and controls those elements to stop the driving of the elements. The above main feature of this invention will be described in detail, typically in a case where the amount of light of the light source is adjusted and in a case where the temperature of the exposure stand is adjusted. However, it goes without saying that this invention can be applied to other cases such as the driving of various motors for driving sheet feed rollers, a pressure-developing motor and so on.

Figure 1:
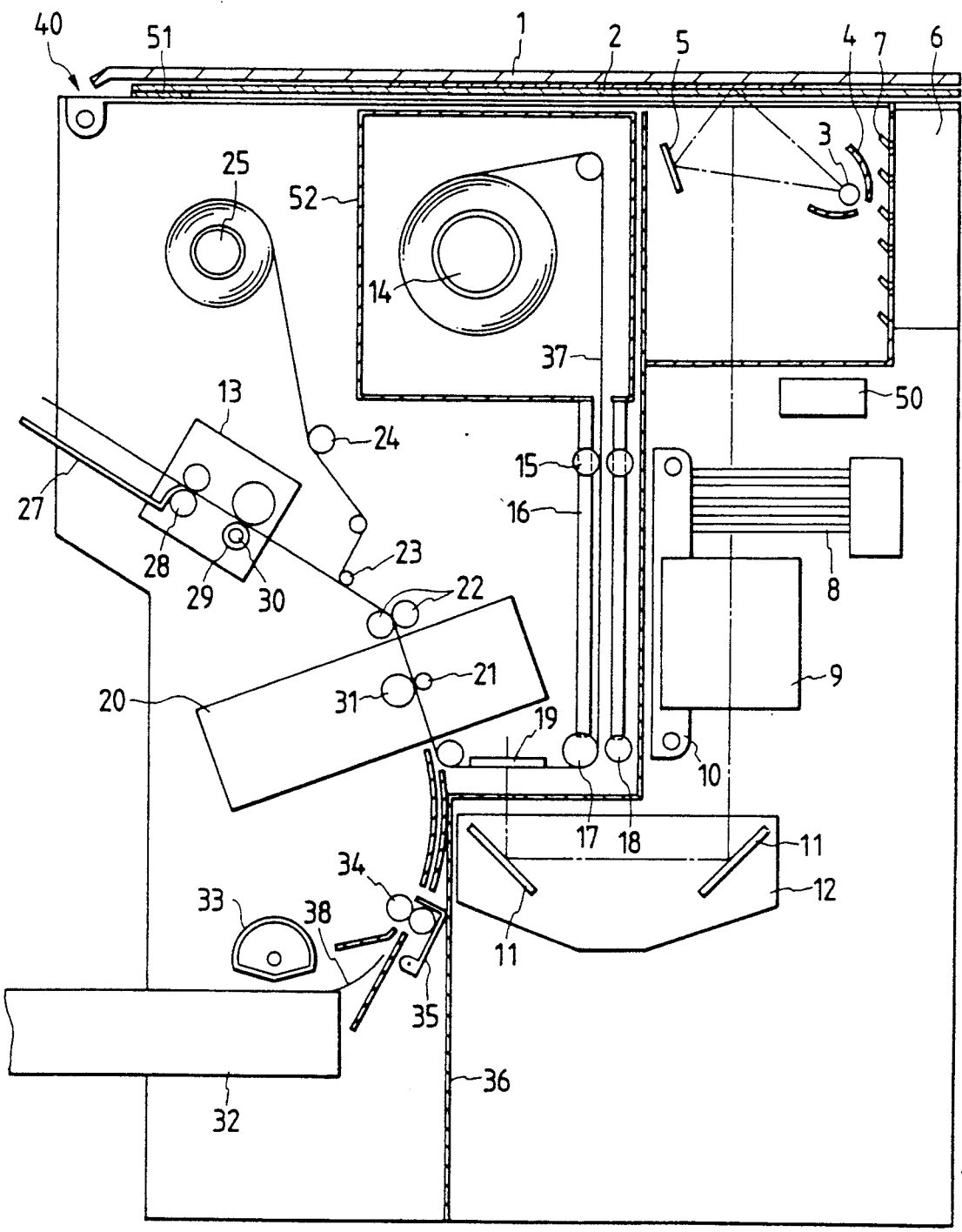
FIG. 1 shows a full-color copying machine to which this invention is applied.

FIG. 1 shows a full-color copying machine to which this invention is applied. This copying machine employs a transfer type image recording sheet including a microcapsule sheet 37 and a developer sheet 38.

As shown in FIG. 1, the copying machine 40 has its top plate portion provided with an original stand glass 2 and an original cover 1 swingably moved between open and closing positions, so that the original stand glass 2 is opened at the open position of the cover 1 and closed at the closing position of the cover 1. The original cover 1 and the original stand glass 2 are movable rightwardly and leftwardly. The original stand glass 2 is formed of light transmissive material and on which a desired original (not shown) is to be placed. At the upper one side section (right side in FIG. 1) of the copying machine 40, fixedly provided is a light source including a linear halogen lamp 3 extending in the direction perpendicular to the moving direction of the original stand glass 2, and a semicylindrical reflector 4 disposed to surround the lamp 3. The light source emits a linear-line light ray to the original stand glass 2. The light emitted from the halogen lamp 3 can be sequentially irradiated on the entire surface over the region from one to another end of the original stand glass 2 in accordance with the horizontal movement of the glass 2. The light from the light source passes through the transparent original stand glass 2 and is reflected at the original mounted thereon. The original cover 1 which covers the top surface of the glass 2 provided in order to prevent this light from leakage out of the apparatus.

To irradiate the light from the halogen lamp 3 on the original at a high efficiency, a reflector 5 is disposed on one side of the light source. The reflector 5 is adapted to direct lights which do not directly propagate toward the original from the light source and concentrate such reflected light onto the original.

At another side of the halogen lamp 3 there are provided a fan 6 and a louver 7 for introducing an external air into the apparatus. Accordingly, air is effectively impinged onto the light source 3 to cool the same.

A filter unit 8 for performing a color tone of an image to be copied and a condenser lens 9 are mounted to a lens mounting plate 10 below the original stand glass 2. Light emitted from the halogen lamp 3 and reflected at the original placed on the original stand glass 2 passes through the filter 8 and enters the lens 9. The filter 8 comprises, for example, three primary color filters and is used to adjust an amount of light of each of the color components ( Red, Green and Blue ) constituting the reflected light from the original by adjusting the insertion amount of each color filter to the light path of the reflected light. The lens 9 is fixedly secured to a lens mounting plate 10, and fine angular adjustment of this lens with respect to a light path is achievable. A pair of reflection mirrors 11 are provided below the lens 9. The condensed lights passing through the lens 9 change their direction by 180 degrees (completely reverse direction) by the two reflection mirrors 11 and the thus oriented lights impinge on the photosensitive recording sheet 37 closely contacting the bottom of an exposure table 19 provided at the center portion of the apparatus to form the latent image thereon. The two reflection mirrors 11 are fixedly mounted to a mirror mounting plate 12, so that the adjustment of the length of the light path and focusing adjustment can be effected by fine adjustment of the position of the mirror mounting plate 12.

Further, a light shielding cover plate 36 is disposed in the apparatus to spacedly divide the apparatus into an optical system and other requisite units. An elongated photosensitive recording sheet (microcapsule sheet) 37 on which microcapsules encapsulating dyes for a color copy are carried is wound around a cartridge shaft 14, and is retained in a photosensitive sheet cartridge 52 that is detachably disposed at a position immediately below an original stand glass 2. In other words, the cartridge 52 storing therein non-light exposed photosensitive sheet 37 is positioned at an upper portion of the apparatus 40. When a copying operation starts, the photosensitive recording sheet 37 is passed through a number of rollers constituting a sheet feeding path and the pressure developing unit 20, and attached to a take-up shaft 25 positioned beside the sheet cartridge 52.

Between the sheet cartridge 52 and the exposure stand 19, a feed roller 15 and a barrel roller 17 are rotatably provided at a vertical sheet path 16 for guiding the sheet therealong toward the exposure stand 19. At the downstream side of the exposure stand 19, there is provided the pressure developing unit 20 which includes a small diameter(pressure) roller 21 and a backup roller 31.

At a lower portion of the apparatus 40, there is provided a developer sheet cassette 32 for storing therein a stack of developer sheets 38. The developer sheet 38 comprises a base coated thereon with developer material and a thermally fusible resin layer formed on the developer material. A sheet having small heat capacity, a plastic such as PET (Polyethylene terephthalate) having large heat capacity and so on may be used as the base. Immediately above the cassette 32, a sector roller 33 is provided to feed the developer sheets 38, toward the pressure developing unit 20 one by one. Between the cassette 32 and the pressure developing unit 20, a roller 34 and a resist-gate 35 are provided so as to align leading edge of the developer sheet 38.

At downstream side of the pressure developing unit 20, a pair of feed rollers 22 are provided so as to provide a constant running speed of the photosensitive sheet 37. This speed is coincident with a horizontally moving speed of the original stand glass 2.

At downstream side of the feed rollers 22, a separation roller unit 23 which provides a meandering sheet pass is provided at which the photosensitive recording sheet 37 is separated from the developer sheet 38. The separate photosensitive recording sheet 37 is taken-up by the above mentioned take-up shaft 25 through a meander travel control roller 24. On the other hand, a heat-fixing unit 13 is provided at the downstream side of the separation roller 23. The heat-fixing unit 13 includes a hollow heat roller 29 having a heater 30 therein and a developer sheet feed rollers 28. The heater 30 formed in the heat roller 29 is supplied with a part of the power from the same power source (not shown) which also supplies another part of the power to the light source (halogen lamp) 3, thereby heating the heat roller 29 to a predetermined temperature. The developer sheet having an image is contacted with the heat roller 29 to heat-fix the image on the developer sheet 38. The heater 30 is controlled by a control unit as described hereinafter so that a further current is supplied to the heater 30 when the temperature of the heat roller 29 is below a predetermined value, and the supply of the current to the heater 30 is ceased when the heat roller 29 is above the predetermined value, thereby keeping the temperature of the heat roller 29 at a predetermined value.

However, as described hereinafter, the heater 30 is controlled by the control unit so that the supply of the current to the heater 30 is constantly ceased when the adjustment of the amount of light to the light source 3 is carried out.

Further, a discharge tray 27 is provided at the downstream side of the heat-fixing unit 13.

The construction and the operation of the above copying machine is described in detail in the co-pending U.S. application Ser. No. 395,359 filed on Aug. 17, 1989 in U.S. PTO which is commonly assigned by the assignee of this application.

The image forming apparatus according to this invention is further provided with various encoders and sensors for detecting and monitoring the operations of the elements for performing a series of the copying processes. For example, there are provided an encoder for detecting a rotation angle of a pressure-developing motor which drives the small-diameter roller 21 in the pressure-developing unit 20, a temperature sensor for detecting the surface temperature of the exposure stand 19, another encoder for detecting a rotation angle of a sheet feed motor which drives the feed rollers 15 and 17, a photosensor for detecting an amount of light of the light source 3, a temperature sensor for detecting the temperature of the heat roller 29 and so on. Further, in this invention, control means for controlling the operations of the above-described elements on the basis of detection signals outputted from the encoders and sensors is further provided. The control means of this invention may be a single control unit for collectively controlling the operations of all the elements or may comprise plural control units for independently controlling each of the elements or collectively controlling some of the elements.

The following description is made for one embodiment of the image forming apparatus having the control means according to this invention, particularly in a case where the amount of light of the light source 3 is adjusted.

In this embodiment, a control unit for collectively controlling the operations of adjusting the amount of light of the light source 3 and heating the heat roller 29. Further, in addition to the elements as described above, an photosensor 50 is provided between the halogen lamp 3 and the filter unit 8, and used to detect the amount of the reflected light from the original when the adjustment of the amount of light is carried out for the light source 3. Further, at the left end of the original stand glass 2 is provided a white reference plate 51 extending in a direction perpendicular to the moving direction of the original stand glass 2. The white reference plate 51 is used to reflect and direct the light emitted from the light source (halogen lamp) 3 to the photosensor 50. The photosensor 50 detects the reflected light and outputs a detection signal representative of the amount of the reflected light as a light-amount adjusting data. The photosensor 50 and the white reference plate 51 constitutes a light-amount adjusting unit 60 as shown in FIG. 2.

Figure 2:
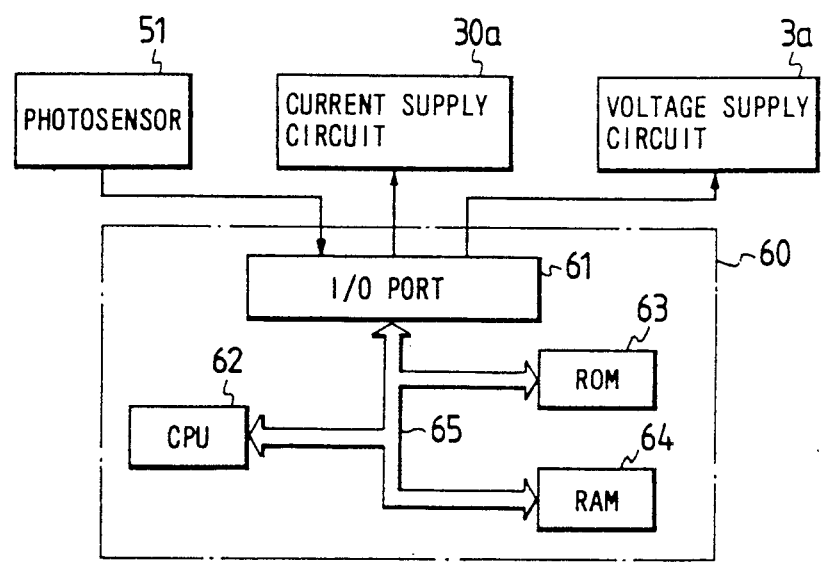
FIG. 2 shows an embodiment of the control unit used in the full-color copying machine as shown in FIG. 1.

FIG. 2 shows the control unit used in the image forming apparatus as shown in FIG. 1.

The control unit 60 as shown in FIG. 2 comprises a microcomputer including an I/O port (or I/O interface) 61 for receiving the detection signal from the photosensor 50 and supplying driving signals to a current supply circuit 30a of the heater 30 and another voltage supply circuit 3a of the light source 3, a CPU 62 for processing input signals thereto, a ROM 63, a RAM 64 and a bus 65 for connecting those elements to one another. The current supply circuits 30a and 3a are supplied with power by the same power source (not shown).

Figure 3:
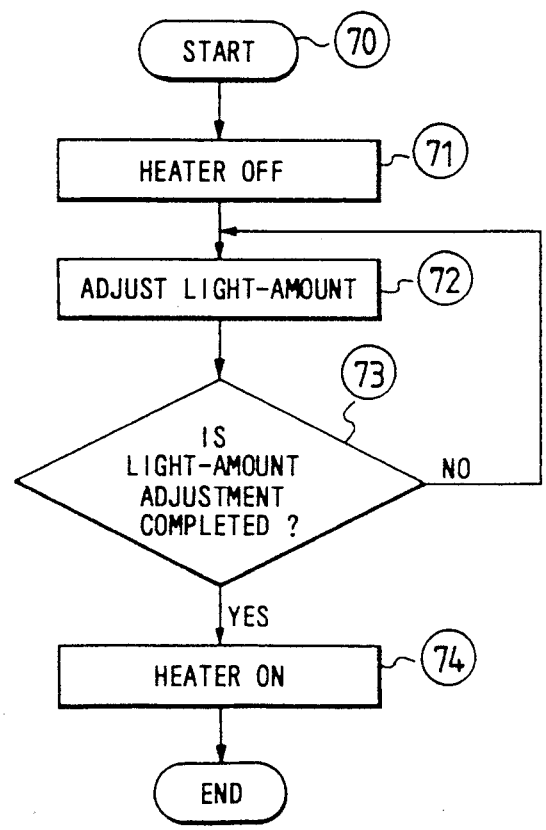
FIG. 3 is a flowchart for performing the operation of the control unit as shown in FIG. 2.

A control program for performing a flowchart as shown in FIG. 3 is stored in the ROM 63, and the CPU conducts the adjustment of the amount of light of the light source 3 along the flowchart as shown in FIG. 3. As shown in FIG. 3, the adjustment operation of the amount of light of the light source 3 starts when the light emitted from the light source 3 is reflected by the white reference plate 51 and the reflected light is detected by the photosensor 50 (step 70). The CPU 62 controls the current supply circuit 30a of the heater 30 to cease the power supply to the heater 30 concurrently with the detection of the reflected light by the photosensor 50 (step 71). Thereafter, the CPU 62 compares the detection signal (voltage value) from the photosensor 50 with a predetermined reference voltage. On the basis of the comparative result, the CPU 62 calculates a voltage to be applied to the light source 3 at which the light source 3 provides a desired amount of light, and outputs a instruction signal representative of the voltage to the current supply circuit 3a of the light source (step 72). The light source 3 is supplied with the voltage designated by the CPU 62 through the voltage supply circuit 3a of the light source 3 to thereby complete the adjustment of the amount of light of the light source 3 (step 73). The adjustment of the amount of light of the light source 3 is stably performed because the power supply to the heater is ceased during the adjustment operation of the amount of light of the light source 3 and therefore the voltage to be applied to the light source 3 is not fluctuated due to the unstable operation of the heater. After the adjustment of the amount of light of the light source 3 is completed, the CPU 62 outputs to the current supply circuit 30a of the heater a signal instructing the reopen of the power supply to the heater 30 to thereby start the operation of the heater 30 (step 74).

The operation of the copying machine provided with the control unit as described above will be described hereunder.

The original cover 1 is opened and the original is placed on the original stand glass 2. After a start bottom (not shown) is pushed to move the original stand glass 2 rightwardly and stop the original stand glass 2 at the position where the left edge of the original stand glass 2 (white reference plate 51) faces the light source 3, the original stand glass 2 is moved leftwardly while the light source (halogen lamp) 3 lights. The white reference plate 51 is provided at the left edge of the reverse side of the original stand glass 2, and therefore the light emitted from the light source 3 is reflected from the white reference plate 51. The reflected light is detected by the photosensor 50 and the adjustment of the amount of light of the light source 3 is performed on the basis of the detected result along the flowchart of FIG. 3. That is, the current supply to the heater 30 is ceased and the voltage to be applied to the light source 3 is increased or decresed until the detection value of the reflected light from the white reference plate 51 is substantially equal to a desired value, that is, until the light source 3 provides a desired amount of light. After the amount of light of the light source 3 is adjusted, the current supply to the heater 30 is reopened.

After the adjustment operation of the amount light of the light source 3 as described above, the original stand glass 2 is rightwardly moved again, and the light emitted from the light source 3 is reflected from the original placed on the original stand glass 2. The reflected light is passed through the filter unit 8, the lens 9 and the reflection mirrors 11 to the photosensitive recording sheet (microcapsule sheet) 37 on the under surface of the exposure stand 19. In this case, the photosensitive recording sheet 37 is leftwardly moved on the under surface of the exposure stand 19 at the same moving speed as the original stand glass 2, so that a latent image corresponding to an original image on the original is formed on the photosensitive recording sheet 37. In synchronism with the leftwardly movement of the photosensitive recording sheet 37, the developer sheet 38 is picked up one by one from the developer sheet cassette 32 by the sector roller 33, and supplied to the pressure-developing unit 20 while closely contacted with the photosensitive recording sheet 37 which has been exposed to light on the exposure stand 19. In the pressure-developing unit 20, the latent image on the photosensitive recording sheet 37 is developed to transfer the latent image to the developer sheet 38 as a visible image. Thereafter, the developer sheet 38 having the visible image is fed to the heat-fixing unit 13 to heat-fix the visible image on the developer sheet 38, and then discharged to the discharge tray 27. On the other hand, the photosensitive recording sheet 37 passed through the pressure-developing unit 20 is wound up successively by the take-up shaft 25. The copying process is completed when the original stand glass 2 has been moved to the position where the right edge of the original stand glass 2 faces the light source 3, and the light source 3 is turn off.

Figure 4:
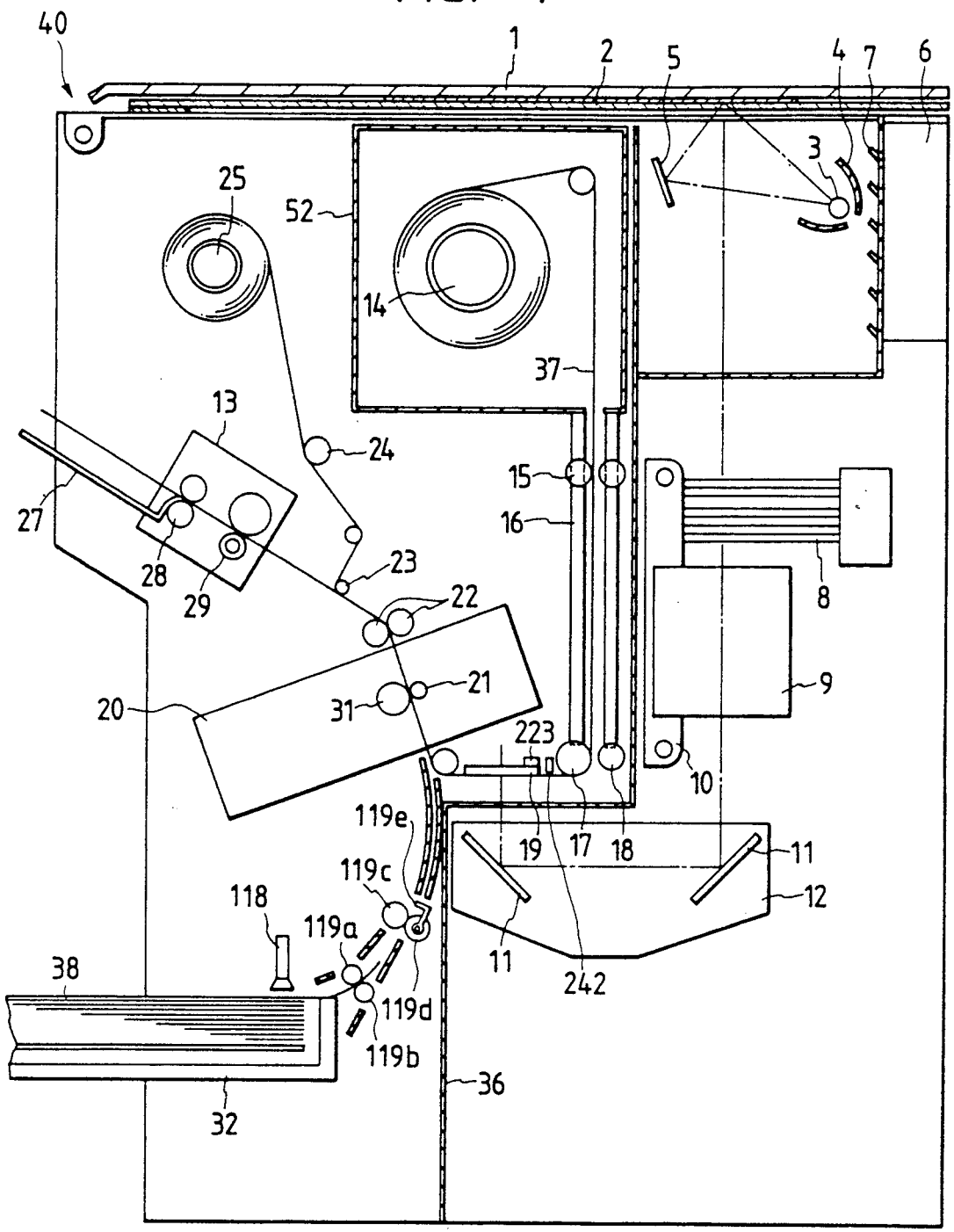
FIG. 4 shows another type of a full-color copying machine to which this invention is applied.

FIG. 4 shows another type of a full-color copying machine in which another embodiment of the control means of this invention is provided. In the above embodiment, the control means has a function of controlling the power supply to and the driving of the elements. However, in this embodiment, in addition to the control function of the power supply by the control means, the control means also has a function of judging as to whether operation conditions of the elements such as the temperature of the heat roller of the heat-fixing unit, the rotation angle of a sheet feed motor, the temperature of an exposure stand, the amount of light of the light source and so on are substantially equal to predetermined ones.

The copying machine as shown in FIG. 4 has the substantially same construction as that of FIG. 1, except for some elements. The same elements as those of FIG. 1 are designated by the same reference numerals and the description thereof is eliminated.

In the full-color copying machine as shown in FIG. 4, a exposure stand heater 242 are further provided in the neighboring of the exposure stand 19, and a temperature sensor for detecting the temperature of the exposure stand 19 is further provided so as to be secured to the top surface of the exposure stand 19. The heater 242 is controlled by the control means according to this invention so that the surface temperature of the exposure stand 19 is kept above a predetermined value to prevent a sensitivity of the photosensitive recording sheet 37 from being lowered when the copying machine is in a low-temperature atmosphere. Further, in place of the pickup mechanism of the developer sheet using the sector roller as shown in FIG. 1, a suction mechanism using a sucker as shown in FIG. 4 may be adopted for picking up the developer sheet one by one. In this case, the developer sheet is picked up by the sucker 118 and fed through a gap between a feed roller 119a and a pinch roller 19b to the pressure-developing unit 20 while the leading edge of the developer sheet 38 is positioned by sheet rollers 19c and 19d and a resist gate 19e.

Figure 5:
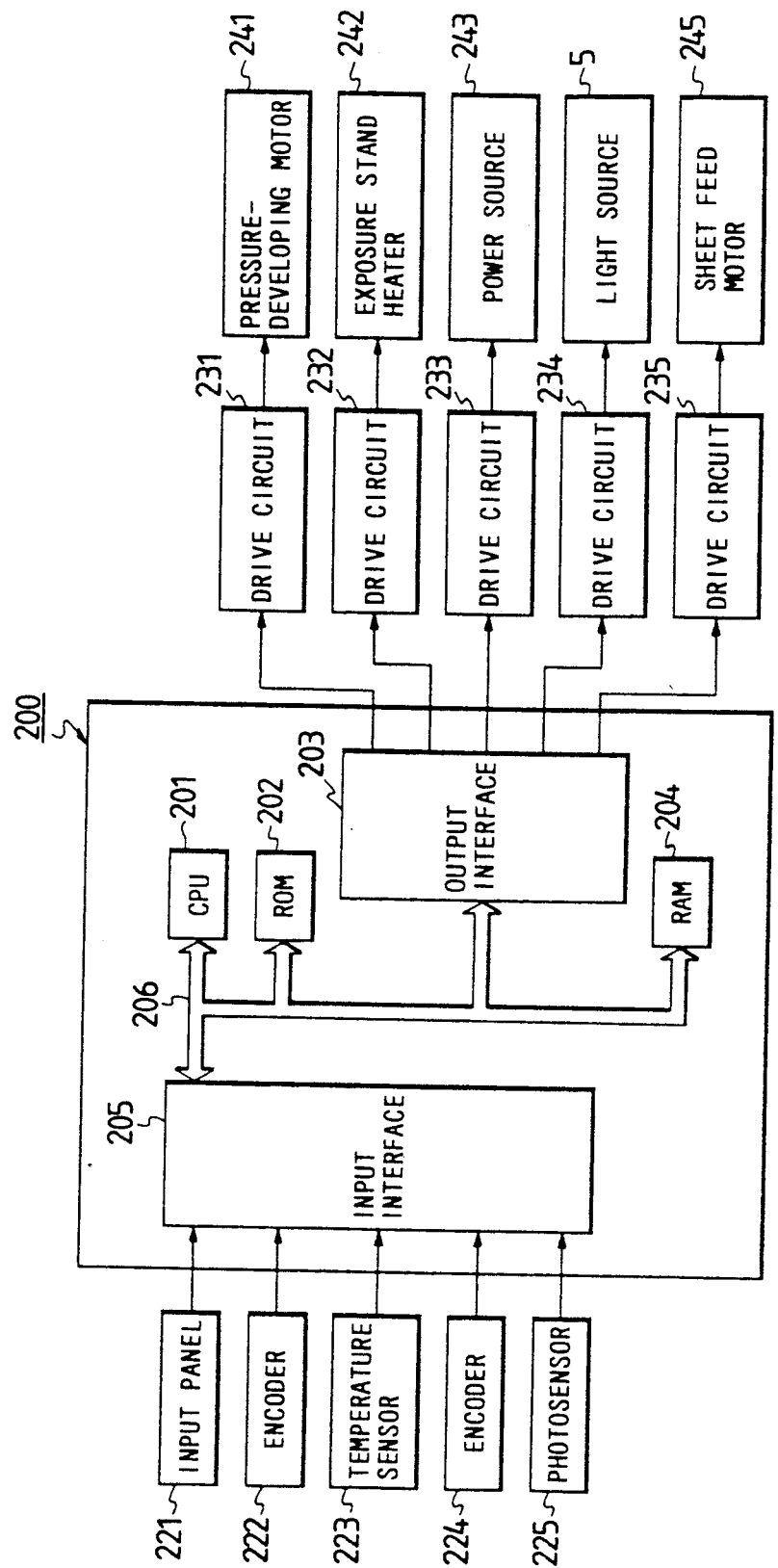
FIG. 5 shows another embodiment of the control unit used in the copying machine as shown in FIG. 4.

FIG. 5 shows the control means used in the copying machine as shown in FIG. 4. In this embodiment, the control means comprises a single control unit 200 for collectively controlling the elements, and has two functions of controlling the power supply to the elements and judging as to whether the operation conditions such as the temperature of the rollers, the rotation angle of the motors, the amount of light of the light source and so on are substantially equal to desired operation conditions.

The control unit 200 of this embodiment is a microcomputer comprising a CPU 201, a ROM 202, a RAM 204, an input interface 205, an output interface 203 and a bus 206 for connecting those elements to one another. In the image forming apparatus of this embodiment are provided an encoder 222 for detecting a rotation angle of a pressure-developing motor 241 which drives the small-diameter roller 21 in the pressure-developing unit 20, a temperature sensor 223 for detecting the surface temperature of the exposure stand 19, an encoder 224 for detecting a rotation angle of a sheet feed motor 245 which drives the feed rollers 15 and 17, and a photosensor for detecting an amount of light of the light source, which are connected to the input interface 205. In addition to those encoders and sensors, an input panel 221 on which data inputting keys and a start switch for starting a series of the copying processes are connected to the input interface 205. The image forming apparatus of this embodiment is further provided with driving circuits 231 to 235 for driving the pressure-developing motor 241, the exposure stand heater 242, the power source 243 supplying power to the elements, the light source 3 and the sheet feed motor 245, respectively. Those elements are connected to the output interface 203. A moving unit (not shown) for moving the original stand glass 2 is also connected to the output interface 203.

The ROM 202 stores a control program and nonvolatile data required for performing a series of the copying processes in the image forming apparatus, such as an amount of light of the light source 3, the surface temperature of the exposure stand 19, the voltage applied by the power source, the fixing temperature of the heat-fixing unit 13 (the temperature of the heat roller 29), the rotation angle of the pressure-developing motor 241, the sheet feed motor 245 and other motors, and so on. The CPU 201 controls the RAM 204 to store the desired data for a predetermined period.

The CPU 201 can perform an arithmetical operation and a logical operation. When a signal representing a pushing operation of the start button on the input panel 221 is supplied from the input panel 221 through the input interface to the CPU 201, drive instruction signals are suitably outputted from the CPU 202 through the output interface 203 to the driving circuits 231 to 235 to drive each of the elements as occasion demands, whereby a series of copying processes are performed. During the copying process, the CPU 201 successively receives through the input interface 205 detection signals which are outputted from the encoders 222 and 224, the temperature sensors 223 and the photosensor 225. The CPU 202 compares the detection signals with the data stored in the ROM 202, and outputs the drive instruction signals through the output interface 203 to the driving circuits 231 to 236 on the basis of the comparative results.

Figure 6:
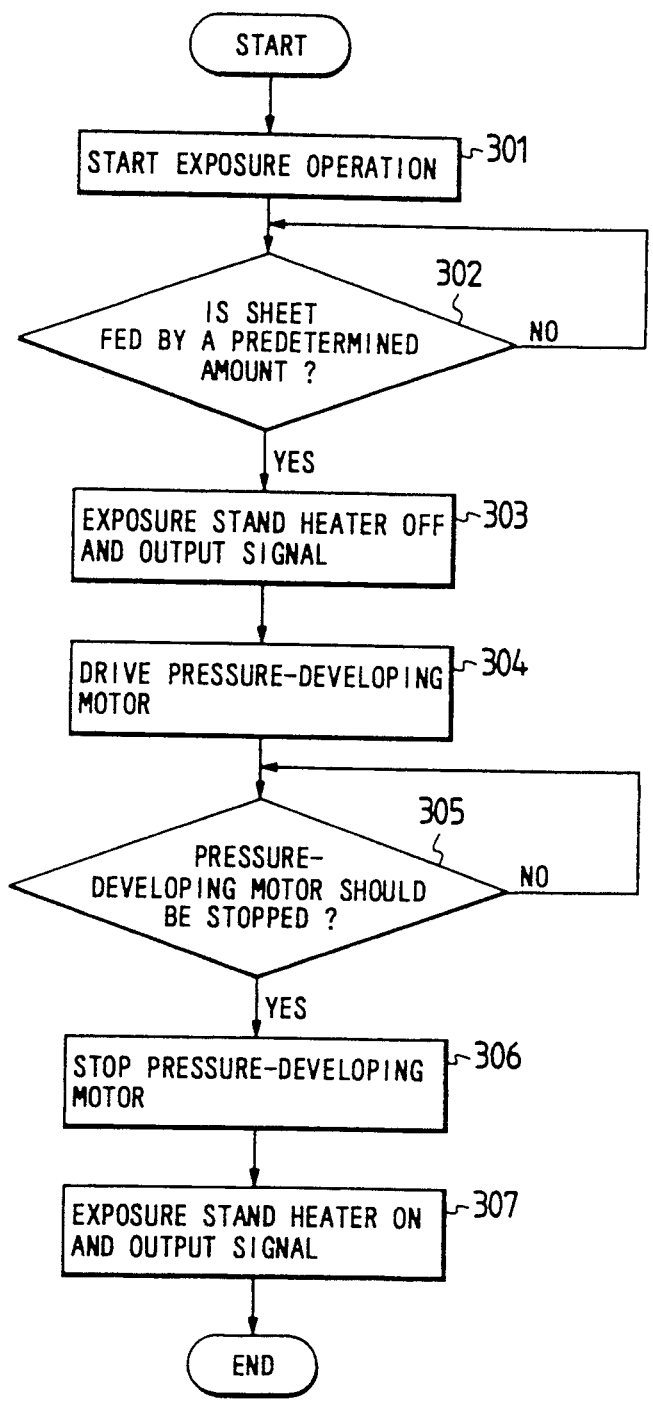
FIG. 6 is a flowchart for performing the operation of the control unit as shown in FIG. 5.

The operation of the control unit 200 as shown in FIG. 5 will be described with reference to the flowchart of FIG. 6, particularly in a case where the temperature of the exposure stand is controlled. The other operations of the control unit 200 for controlling the other elements such as the light source, the motors for the pressure-developing rollers and the sheet feed rollers and so on may be carried out in the substantially same manner as the following operation.

When an operator pushes a power supply switch (not shown) provided on the input panel 221 of the image forming apparatus, the apparatus is switched to a standby state, that is, to an operable state, and the control unit 200 starts a control operation. In an initial step, the control unit 200 reads a temperature detection signal from the temperature sensor 223 for the exposure stand 19 through the input interface 205. If the control unit 200 judges from the temperature detection signal that the surface temperature of the exposure stand 19 is below a predetermined value, the control unit 200 outputs a drive instruction signal through the output interface 203 to the driving circuit 232 to drive the exposure stand heater 242 until the temperature sensor 223 outputs a temperature detection signal representing that the surface temperature of the exposure stand is substantially equal to the predetermined value. In a next step, upon receiving a signal representing that the operator pushes a copy start switch (not shown) on the input panel 221, the control unit 200 outputs a drive instruction signal to the driving circuit 234 to allow the light source 3 (for example, halogen lamp) to light (step 301). After lighting the light source 5, the control unit 200 reads a rotation angle detection signal representing the rotation angle of the sheet feed motor 245 which is supplied from the encoder 224 through the input interface 205, and compares the rotation angle detection signal with the data stored in the ROM 202 to judge from the comparative result whether a predetermined amount of the photosensitive recording sheet 37 (for example, an area in which a latent image corresponding to the original image can be formed) is passed over the exposure stand (step 302). If the control unit 200 judges in the step 302 that the photosensitive recording sheet 37 is fed by a predetermined distance, that is, the predetermined area of the photosensitive recording sheet 37 is passed over the exposure stand, the control unit 200 outputs a drive stop signal to the driving circuit 232 to temporally stop the driving of the exposure stand heater 242 (step 303). In this case, there is no possibility that the temperature of the exposure stand 19 is rapidly decreased. Thereafter, the control unit 200 outputs a drive signal through the output interface 203 to the driving circuit 231 to drive the pressure-developing motor 241 (step 304). Further, the control unit 200 reads a rotation angle detection signal representing a rotation angle of the pressure-developing motor 241 from the encoder 222 through the input interface 205, and compares the rotation angle detection signal with the data stored in the ROM 202 to judge from the comparative result that the photosensitive recording sheet 37 and the developer sheet 38 contacted therewith are passed through the pressure-developing sheet by a predetermined amount, that is, that the area of the photosensitive recording sheet in which the latent image is formed is passed through the pressure-developing unit 20. The driving of the pressure-developing motor 241 is continued by the control unit 200 until the control unit 200 judges that the predetermined amount of the photosensitive recording sheet 37 has been passed through the pressure-developing unit 20 (step 304). After judging that the predetermined amount of the photosensitive recording sheet 37 has been passed through the pressure-developing unit 20, the control unit 200 outputs a drive stop signal through the output interface 203 to the driving circuit 231 to stop the driving of the pressure-developing motor 241 (step 306). Thereafter, the control unit 200 outputs a drive signal through the output interface 203 to the driving circuit 232 to drive the exposure stand heater 242 again while monitoring the temperature detection signal supplied from the temperature sensor 223 through the input interface 205 (step 307). In the above proceses, the judgement of the CPU 201 for each of the elements may be performed by comparing the detection signals from the sensors and encoders with predetermined data stored beforehand in the ROM 202.

In the above embodiment, the control operations of the control unit 200 for the various elements are carried out one after another. However, the operations may be carried out parallel to one another. Further, in the above embodiment, the CPU 200 controls the pressure-developing motor, the exposure stand heater, the power source, the light source and the sheet feed motor. However, the elements to be controlled by the CPU 200 are not limited to the above elements. For example, the heater of the heat-fixing unit and the other elements which provide high loads to the power source may be controlled by the CPU 200 in the substantially same manner as described above.

As described above, according to this invention, the control unit controls the power supply to and the driving of the elements of the image forming apparatus simultaneously or successively so that when one element providing a high load to the power source is operated, the power supply to and the driving of another element, which provides a high load to the power source and is not required to be operated, is ceased. For example, when the amount of light of the light source is adjusted, the power supply from the power source to the heater of the heat-fixing unit is ceased, so that the voltage to be applied to the light source is not fluctuated during the adjustment operation of the amount of light of the light source and therefore the adjustment operation is accurately performed. Further, the power supply to and the driving of the exposure stand heater is ceased when the pressure-developing motor providing a high load to the power source is operated, and the power supply to and the driving of the pressure-developing motor is ceased when the exposure stand heater is driven. Accordingly, the power source is not required to simultaneously supply a power to the elements providing high loads and therefore no power source having a large capacity is not necessarily used. This enables the image forming apparatus to be miniaturized and both of the cost of the apparatus and the power to be consumed by the apparatus to be reduced.

What is claimed is:

1. An image forming apparatus including elements for performing a series of copying processes to form an image on a sheet and at least one power source for commonly supplying a power to the elements, comprising:

sensor means for detecting an operational condition of each of the elements and outputting a detection signal representative of the operational condition; and control means for controlling the power supply from said power source to the elements so that when the power supply to one of the elements is carried out to drive said one of the elements, the power supply to at least one of the other elements is ceased to stop the driving of said at least one of the other elements, and controlling said one of the elements on the basis of the detection signal from said sensor means so that the operational condition of said one of the elements is substantially equal to a predetermined operational condition.

2. An image forming apparatus as claimed in claim 1, wherein said one of the elements comprises a light source, said at least one of the other elements comprises a heater for heat-fixing the image on the sheet and said sensor means comprises a photosensor for detecting an amount of light of said light source and outputting the detection signal representative of the amount of light to said control means, and wherein said control means ceases the power supply to said heater when an adjustment of the amount of light of said light source is carried out and controls the power supply to said light source on the basis of the detection signal so that the amount of light of said light source is substantially equal to a predetermined one.

3. An image forming apparatus as claimed in claim 2, further comprising a voltage supply circuit for supplying a voltage to said light source and a current supply circuit for supplying a current to said heater, and wherein said control means controls said current supply circuit to stop the current supply to said heater when receiving the detection signal from said photosensor, and then controls said voltage supply circuit to adjust the voltage to be applied to said light source in accordance with a voltage of the detection signal.

4. An image forming apparatus as claimed in claim 1, wherein said control means includes judging means for comparing the detection signal from said sensor means with a predetermined value and judging from the comparative result whether the operational condition represented by the detection signal is substantially equal to the predetermined operational condition, and driving means for driving said one of the elements until the operational condition is substantially equal to the predetermined operational condition.

5. An image forming apparatus as claimed in claim 1, wherein said control means is a microcomputer.

* * * * *